United States Patent
Brown (10) Patent No.: US 6,982,504 B2
(45) Date of Patent: Jan. 3, 2006

(54) GALVANOMETER MOTOR WITH COMPOSITE STATOR ASSEMBLY

(75) Inventor: David C. Brown, Northborough, MA (US)

(73) Assignee: GSI Group Corporation, Billerica, MA (US)

( * ) Notice: Subject to any disclaimer, the term of this patent is extended or adjusted under 35 U.S.C. 154(b) by 0 days.

(21) Appl. No.: 10/350,767

(22) Filed: Jan. 24, 2003

(65) Prior Publication Data

US 2004/0145249 A1    Jul. 29, 2004

(51) Int. Cl.
 *H02K 35/02*    (2006.01)

(52) U.S. Cl. .................................. 310/36; 359/199

(58) Field of Classification Search ............ 310/36–39; 359/198, 199
See application file for complete search history.

(56) References Cited

U.S. PATENT DOCUMENTS

| | | | |
|---|---|---|---|
| 3,644,763 A | 2/1972 | Skrobisch | 310/36 |
| 3,736,543 A | 5/1973 | Lademann et al. | 336/200 |
| 4,076,998 A | 2/1978 | Montagu | 318/132 |
| 4,271,370 A | 6/1981 | DiMeo | 310/266 |
| 4,340,833 A | 7/1982 | Sudo et al. | 310/268 |
| 4,767,489 A * | 8/1988 | Lindner | 156/345.15 |
| 4,845,424 A * | 7/1989 | Gamble | 324/146 |
| 4,962,329 A * | 10/1990 | Fujita et al. | 310/208 |
| 5,059,677 A * | 10/1991 | Kohtoh et al. | 528/353 |
| 5,220,233 A * | 6/1993 | Birch et al. | 310/156.28 |
| 5,225,770 A | 7/1993 | Montagu | 324/146 |
| 5,272,938 A * | 12/1993 | Hsu et al. | 74/594.1 |
| 5,424,632 A | 6/1995 | Montagu | 324/146 |
| 5,754,327 A * | 5/1998 | Masotti et al. | 359/198 |
| 5,839,188 A * | 11/1998 | Pommer | 29/830 |
| 5,982,521 A | 11/1999 | Bessho et al. | 359/198 |
| 6,169,354 B1 * | 1/2001 | Springer et al. | 310/268 |
| 6,218,803 B1 | 4/2001 | Montagu et al. | 318/662 |
| 6,265,794 B1 | 7/2001 | DeBoalt | 310/36 |
| 6,275,319 B1 | 8/2001 | Gadhok | 359/198 |
| 6,307,292 B1 * | 10/2001 | Brown | 310/90 |

* cited by examiner

*Primary Examiner*—Darren Schuberg
*Assistant Examiner*—Judson H. Jones
(74) *Attorney, Agent, or Firm*—Gauthier & Connors (57) ABSTRACT

A limited rotation torque motor is disclosed including a rotor with at least one pair of magnetic poles and a stator with at least one pair of stator coils. Each stator coil includes a plurality of layers of interconnected flexible circuit composites. Each flexible circuit composite includes a dielectric material and a patterned conductive material on one side of said dielectric material.

17 Claims, 12 Drawing Sheets

GALVANOMETER MOTOR WITH COMPOSITE STATOR ASSEMBLY

BACKGROUND

The invention relates to limited rotation motors such as galvanometers, and particularly relates to limited rotation torque motors used to drive optical elements such as mirrors for the purpose of guiding light beams in scanners.

Limited rotation torque motors generally include stepper motors and galvanometer motors. Certain stepper motors are well suited for applications requiring high speed and high duty cycle sawtooth scanning at large scan angles. For example, U.S. Pat. No. 6,275,319 discloses an optical scanning device for raster scanning applications that includes a multi-pole moving magnet rotor and a stator formed of a large number of rings (laminations), each of which includes radially directed teeth having individual coils wound around the teeth.

Limited rotation torque motors for certain applications, however, require the rotor to move between two positions with a precise and constant velocity rather than by stepping and settling in a sawtooth fashion. Such applications require that the time needed to reach the constant velocity be as short as possible and that the amount of error in the achieved velocity be as small as possible. To achieve this, a very high torque constant must be provided by the motor requiring as high a flux density as possible. This generally requires that the number of coil turns in the gap between the rotor and the stator be maximized without increasing the size of the gap.

Figure 1:
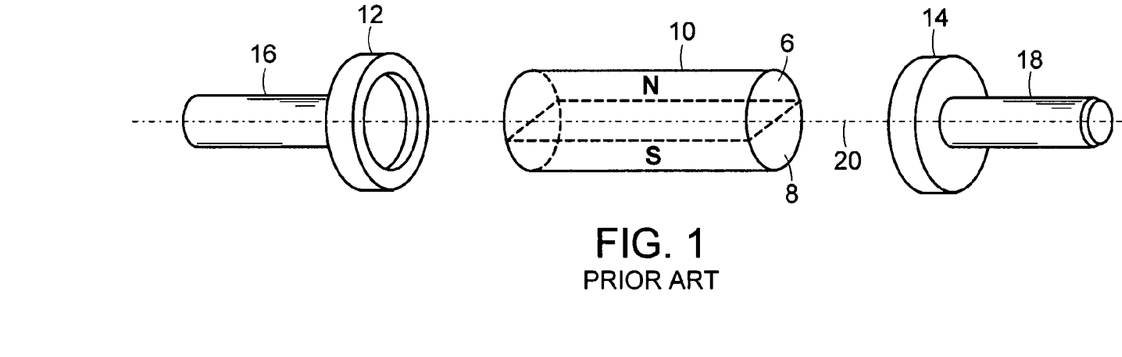
FIG. 1 shows an illustrative exploded view of a prior art rotor assembly for use in a galvanometer scanner.
Figure 2:
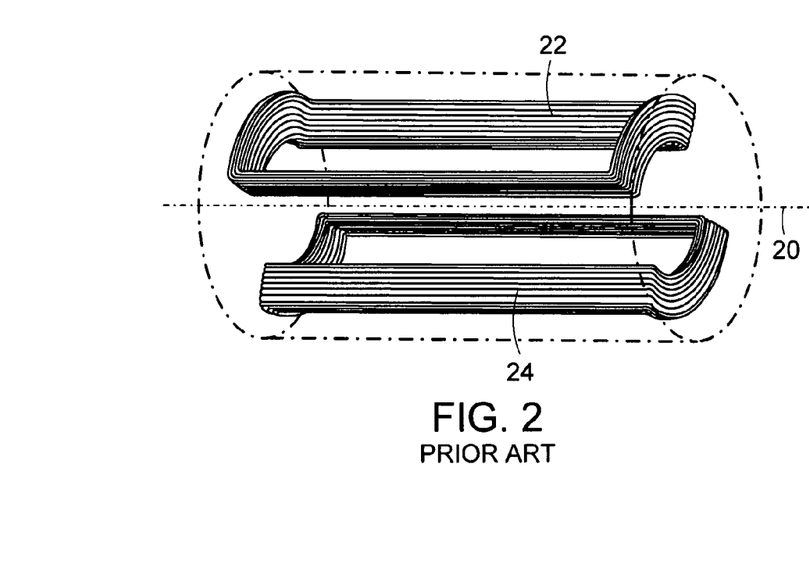
FIG. 2 shows an illustrative isometric view of a pair of prior art stator coils for use with the rotor of FIG. 1.
Figure 3:
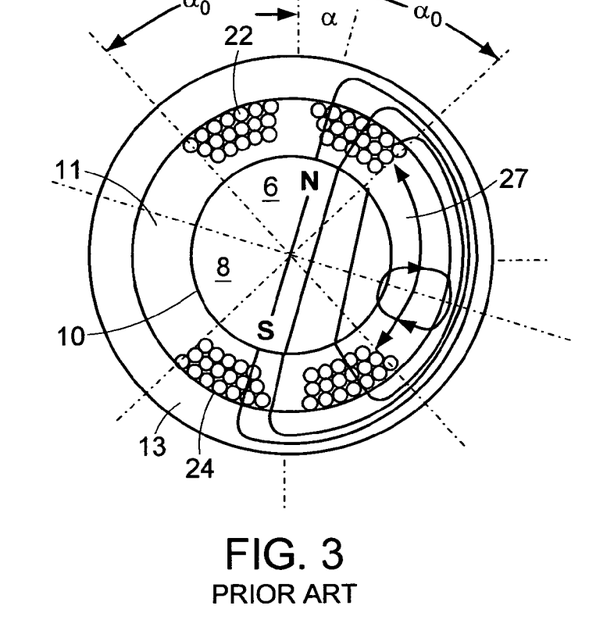
FIG. 3 shows an illustrative diagrammatic sectional view through a conventional solid magnet two-pole galvanometer.
Figure 4:
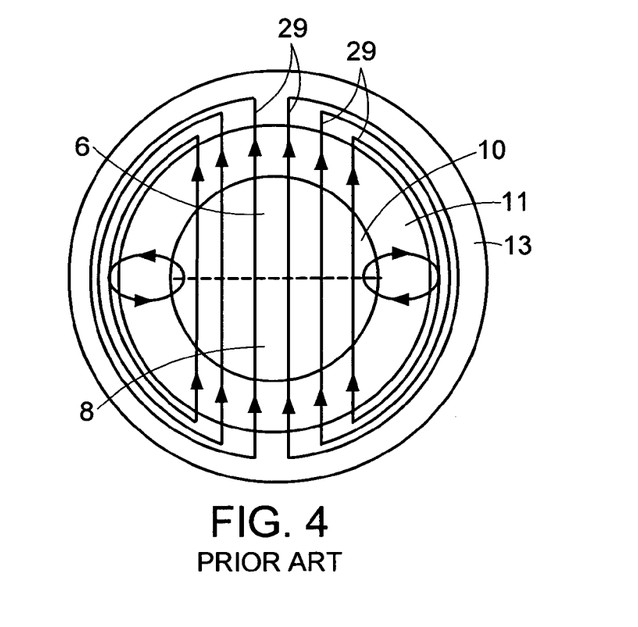
FIG. 4 shows an illustrative diagrammatic sectional view through a conventional solid magnet two-pole galvanometer showing illustrative lines of magnetic flux.

Galvanometer motors generally provide a higher torque constant and typically include a rotor and drive circuitry for causing the rotor to rotate through a limited rotation range about a central axis in a controlled manner. A position transducer, e.g., a tachometer or a position sensor, and a feedback circuit coupled to the transducer permit the rotor to be driven by the drive circuitry responsive to an input signal and a feedback signal. For example, U.S. Pat. No. 5,225,770 discloses a conventional two-pole galvanometer motor, which is described below and shown herein in FIGS. 1–4 labeled prior art. The two-pole galvanometer includes a solid magnetic rotor 10 that is captured between two end portions 12 and 14 that in turn are coupled to two shafts 16 and 18 as shown in FIG. 1. The rotor 10 is polarized into essentially two semi-cylindrical magnetic portions 6 and 8 having opposite magnetic polarity, e.g., N and S. As shown in FIGS. 2–4, a stator for use with the rotor 10 of FIG. 1 may include two stator coil portions 22 and 24 and a magnetically permeable stator housing or backiron 13. The coil portions 22, 24 are attached to the housing 13 and disposed on opposite sides of the rotor within an annular space or gap 11 formed between the housing 13 and the rotor 10 such that the rotor is free to rotate about the axis 20 while the stator remains stationary.

A shown in FIG. 3 the coil portions 22 and 24 subtend a half angle of $\alpha_0$. In conventional galvanometers, the half angle $\alpha_0$ limits the angle of rotation of the rotor, which is generally limited to about 23 degrees. As the rotor rotates, however, the rotor poles N & S rotate toward the coil portion half angles $\alpha_0$ such that a portion of each semi-cylindrical magnetic section 6 and 8 is facing open space 27 between the opposing coils. In this case, the system is said to be underhung meaning that in extreme rotational positions of the rotation of the rotor 10, part of the rotor 10 is not opposed by coil windings 22 and 24. Since an underhung system has fewer coil windings available to drive the rotor 10 at the extreme edges of rotor rotation, there is less torque available to drive the rotor 10 at the edges of the travel. This results in lower acceleration of the rotor 10 at precisely the regions where high acceleration is desirable. If the number of stator coils is increased to fill the open space 27 such that the coils extend circumferentially further than the magnetic sections, then the system is overhung. This increases the torque available at the extreme edges of travel but at the expense of compromising other performance characteristics. In particular, the additional coil winding increase the overall coil resistance thereby increasing the heat that must be dissipated from the system. Accordingly, a prior art two coil galvanometer has an optimum number and configuration of stator coils that may be placed in the gap to drive the motor for providing sufficient torque while not exceeding heat dissipating capacity.

Another problem with conventional galvanometer systems, however, is fringing. As shown in FIG. 4, a plurality of flux lines 29 show the flux path of a conventional solid magnet two-pole galvanometer. Following the flux lines 29, a magnetic flux passes from the N pole 6 of the solid magnetic rotor 10, across the gap 11 between the magnetic rotor 10 and a backiron 13, circumferentially around the backiron 13, across the gap 11 and a second time to the S pole 8 of the solid magnet rotor 10 and then through the rotor returning to the N pole portion. As will be readily understood, the magnetic permeability of the magnet portions 6 and 8 and the backiron 13 may be many thousands of times greater than the magnetic permeability of the air and copper of the coils windings (shown in FIG. 3) that are present in the gap 11. Accordingly, there is a high reluctance or resistance to the flow of magnetic flux passing in the gap 11. As a result of the high reluctance in the gap 11, fringing occurs near the boundary 21 between the magnetic N and S portions 6 and 8. This condition is shown in FIGS. 3 & 4 wherein local flux lines 23 pass from one magnetic section to another without passing through any of the stator coil windings 22 and 24. Accordingly, the magnetic portions N and S, 6 and 8, near the border 27 do not contribute to generating torque for rotating the rotor 10. Since this flux never passes through a wire, it is lost to the torque-producing process. It is estimated that more than 15% of the magnetic volume near the equator is ineffective in producing torque for this reason, although the local magnet mass contributes excessively to the moment of inertia of the rotor since it is all positioned far from the axis of rotation. Accordingly, in spite of occupying 360 degrees of the rotor surface, only about 270 degrees of magnetic material is effective in producing torque such that a conventional two pole galvanometer configuration contains a large volume of space in the gap 11 between the edges of the two stator coils that produces no useful flux.

There are applications in which it is desirable to have greater torque than may be provided by conventional limited rotation torque motors. There is a need therefore, for limited rotation torque motors that provide improved flux density without adversely affecting the performance of the motor.

SUMMARY OF THE INVENTION

A limited rotation torque motor is disclosed including a rotor with at least one pair of magnetic poles and a stator with at least one pair of stator coils. Each stator coil includes a plurality of layers of interconnected flexible circuit composites, and each flexible circuit composite includes a dielectric material and a patterned conductive material on one side of the dielectric material. In certain embodiments, the stator coils are provided on a continuous web that is wrapped upon itself such that layers of flexible circuit composites at least substantially overlay one another.

BREIF DESCRIPTION OF THE DRAWINGS

The following description may be further understood with reference to the accompanying drawings in which.

The drawings are shown for illustrative purposes and are not to scale.

DETAILED DESCRIPTION OF THE ILLUSTRATED EMBODIMENTS

Figure 5A:
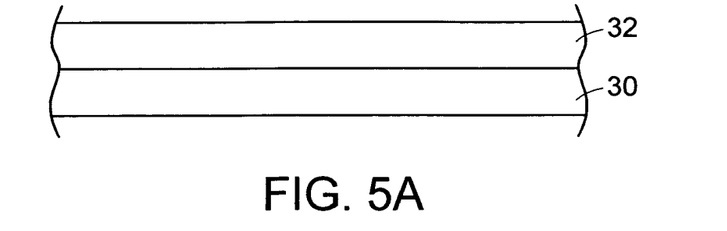
FIGS. 5A–5C show illustrative diagrammatic views of the formation of a portion of a flexible circuit composite for a stator coil in accordance with an embodiment of the invention.

In accordance with an embodiment of the invention, a stator for a limited rotation torque motor may be developed using flexible circuit composites. The flexible circuit composites may be formed by depositing a conductive metal 32 onto a dielectric substrate 30 as shown in FIG. 5a. The dielectric substrate 30 may include, for example mylar, polyester, polyethylene, polyethylene, polyamides, or polyethyl ketone etc., and may be provided having a thickness of about 10 to about 100 microns. The conductive material, e.g., copper or aluminum etc., may be deposited by vacuum deposition, chemical vapor deposition, sputter deposition, film transfer etc., and may be deposited to a thickness of about 10 to about 80 microns, and preferably about 45 microns. The composite may be, for example, about 150 to about 200 microns high by about 40 to about 50 inches in length.

Figure 5B:
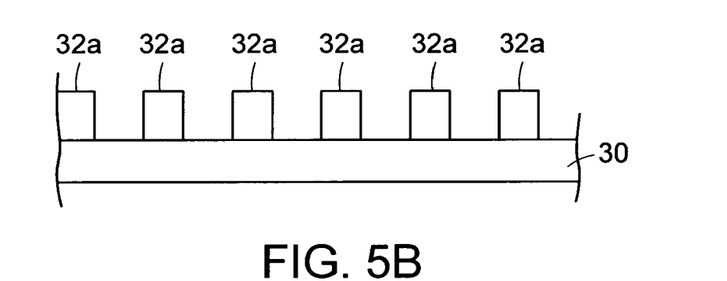

A mask is then applied to the composite to block certain regions of the conductive material 32, and the unmasked portions of the conductive material are then exposed to an etching environment that removes the exposed portions of the conductive material 32. The mask is then removed, leaving the unexposed portions 32a of the conductive material 32 as shown in FIG. 5B.

Figure 5C:
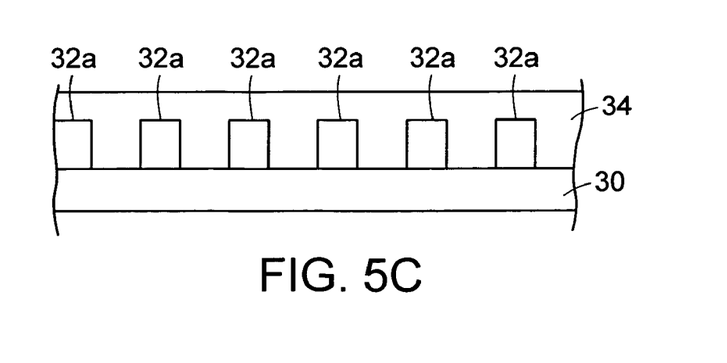

A second layer of dielectric material 34, e.g., a clear polyester material, is then deposited onto the patterned conductive material 32a as shown in FIG. 5C. The second layer of dielectric material 34 preferably fills the voids that remain from the etching and may optionally cover the patterned conductive material 32a.

Figure 6:
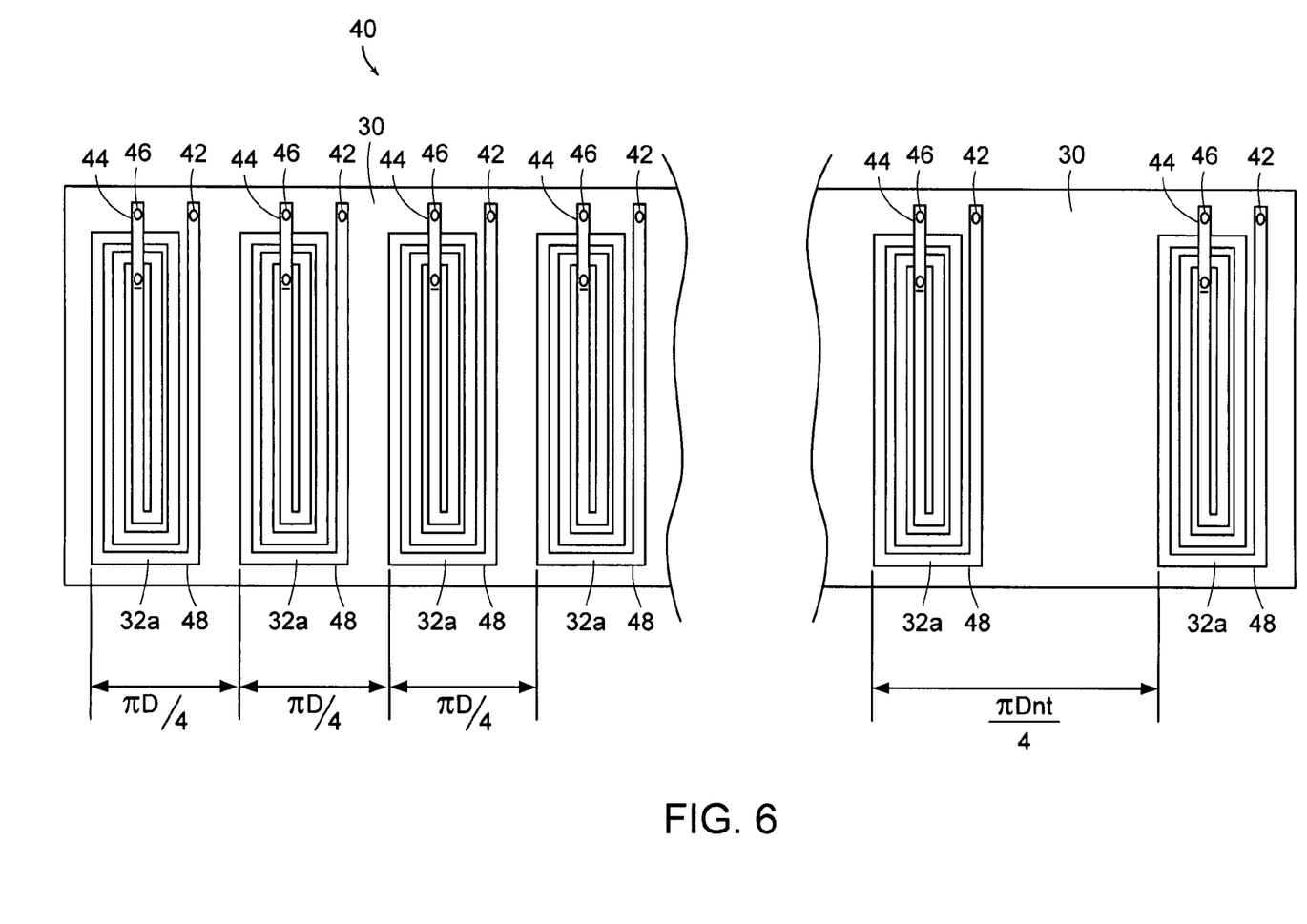
FIG. 6 shows an illustrative diagrammatic view of portions of a continuous web that includes flexible circuit composites for a stator in accordance with an embodiment of the invention.

The pattern formed by the above processes provides a plurality of individual flat coil windings that form flexible circuit composites 48 along a web formed of the dielectric material 30 as shown in FIG. 6. Each flexible circuit composite 48 includes first electrical contact lead 42, and second electrically conductive bridge material 44 that is deposited on the clear dielectric and contacts the inner starting point of each coil, and may optionally also be covered with further dielectric material. A second electrical contact lead 46 may then be provided on each conductive bridge material 44 as shown.

The flexible circuit composites 48 are positioned along the web 30 such that when the web is wrapped around itself in the long direction, the first four composites 48 will form a circle and the fifth composite will overlay the first composite. In this fashion, the flexible circuit composites will provide four radially outwardly directed stacks. The spacing of each composite is adjusted in groups of four to account for the thickness of the material as it is wrapped upon itself. In particular, the first four flexible circuit composites each are spaced a distance apart of $\pi D/4$ where D is the inner diameter of the desired stator. The next set of four flexible circuit composites (nos. 5–8 provided on the second turn) are spaced a distance apart of $\pi D/4$ (2t) where t is the thickness of the flexible circuit composite (including the materials 30, 32 and 34). The final four flexible circuit composites (provided at the $n^{th}$ turn) are spaced a distance apart of $\pi D(nt)/4$ as shown in FIG. 6.

Figure 7:
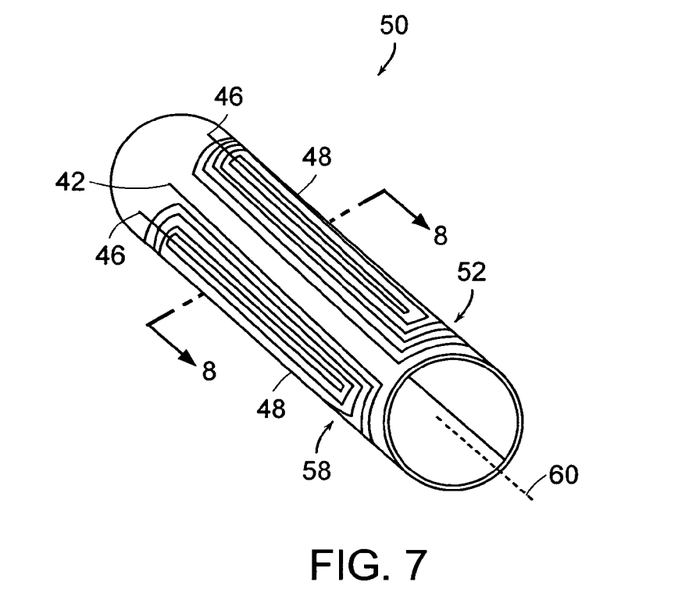
FIG. 7 shows an illustrative isometric view of a stator in accordance with an embodiment of the invention.
Figure 8:
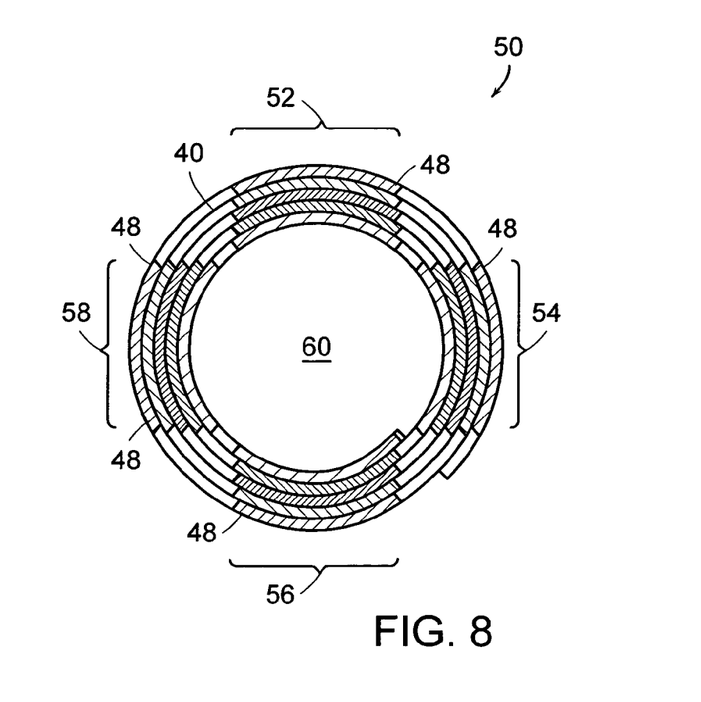
FIG. 8 shows an illustrative sectional diagrammatic view of the stator of FIG. 7 taken along line 8—8 thereof.

The radially stacked flexible circuit composites 48 form composite coil assemblies 52, 54, 56, 58 as shown in FIGS. 7 and 8. The composite coil assemblies are then electrically coupled together to form a stator 50 that is centered about a center line 60. Each composite coil assembly 52, 54, 56, 58 may include a plurality of stacked flexible circuit composites 48, e.g., 10 to 30, that are connector to form four individual stator coils in accordance with an embodiment of the invention. In further embodiments, any number of 2 or more stator coils may be formed.

Figure 9:
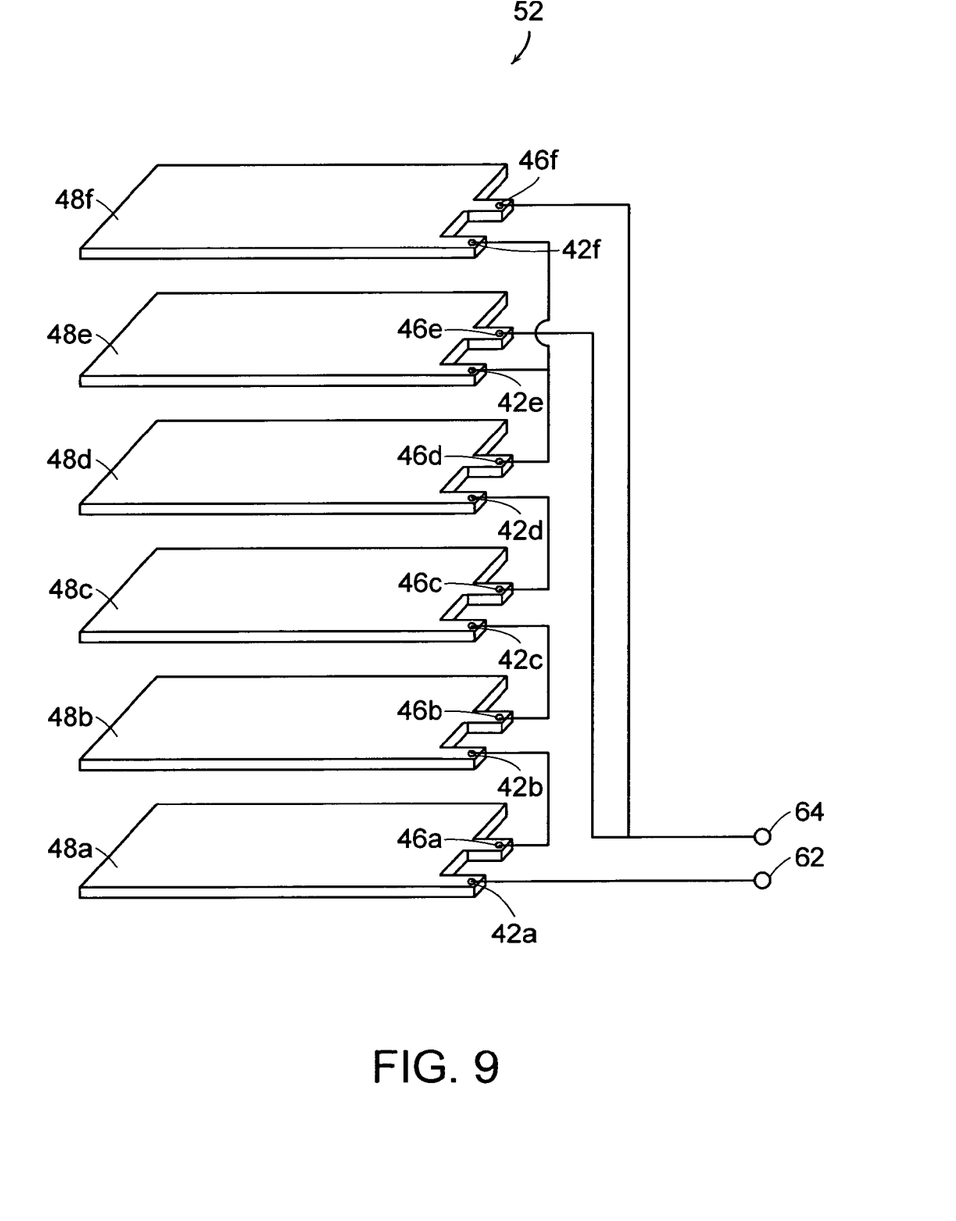
FIG. 9 shows an illustrative diagrammatic view of a coil module connection arrangement of flexible circuit composites in accordance with an embodiment of the invention.

Each flexible circuit composite of a coil assembly may be coupled to the other flexible circuit composites of the coil assembly in a variety of arrangements. For example, as shown in FIG. 9, the first (or most radially inward) flexible circuit composite 48a may be coupled to a plurality of further composites 48b–48d in series, with the remaining flexible circuit composites 48e and 48f connected to the first four composites 48a–48d in parallel as shown. Source current may then be applied at 62 and 64 as shown. This arrangement permits the heat in the outer (48e and 48f) layers to be more readily dissipated through the use of parallel-coupled heat dissipating layers. In one embodiment, for example, a coil module may include fifteen flexible circuit composites coupled in series, followed by five flexible circuit composites coupled in parallel with the first fifteen.

Figure 10:
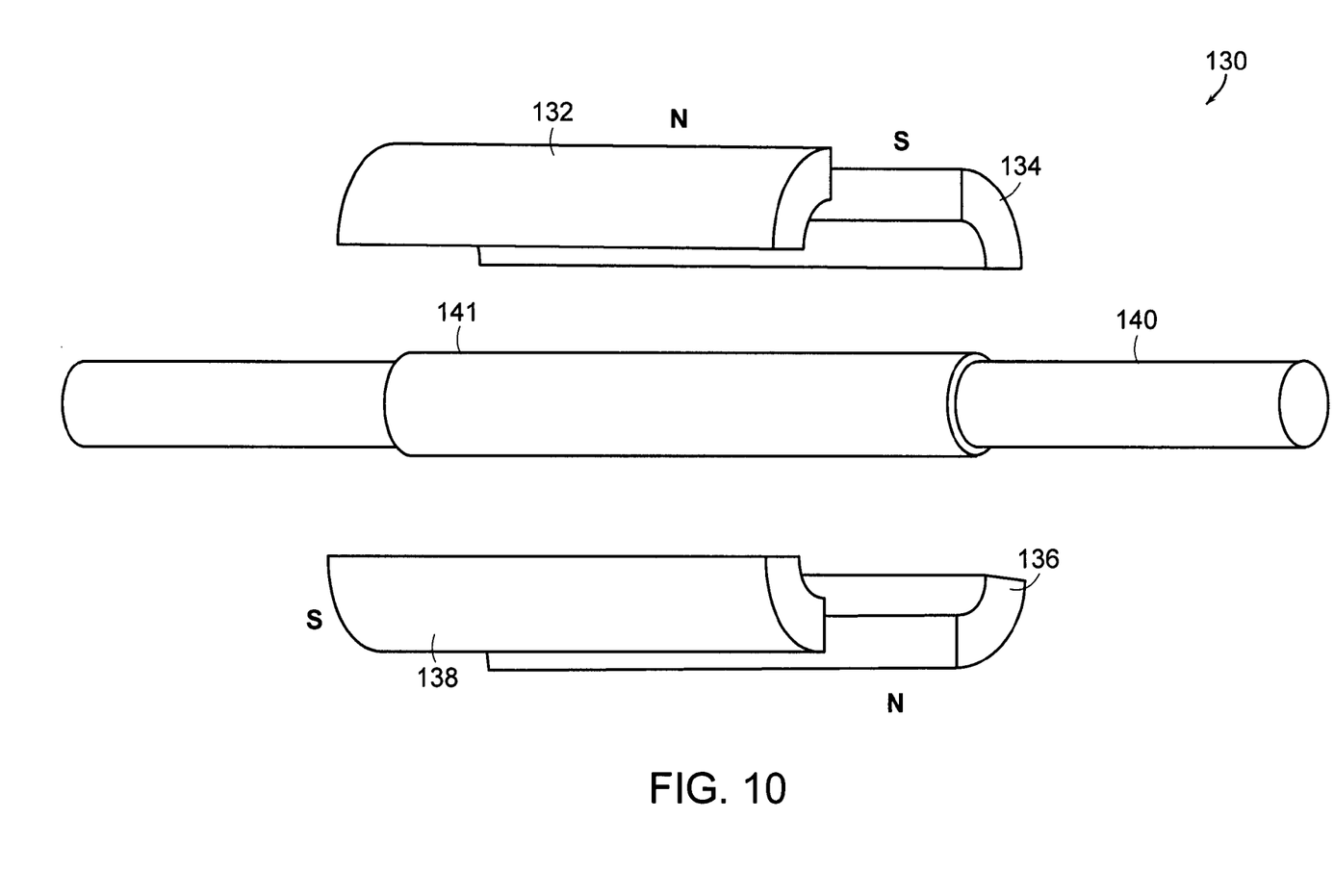
FIG. 10 shows an illustrative exploded view of a rotor assembly in accordance with an embodiment of the invention.

A rotor that may be used with the stator 50 in accordance with an embodiment of the invention is shown in FIG. 10. The rotor 130 includes four magnetic segments 132, 134, 136 and 138, two of which (132 and 136) are N (north) pole magnets, and two of which (134 and 138) are S (south) pole magnets. The magnetic segments are fixed to a shaft 140 on which scanning elements (e.g., a mirror) may be mounted. In the embodiment shown in FIG. 10, the magnetic segments are bonded to a magnetically permeable sleeve 141 that is bonded to the shaft 140. The shaft 140 may be magnetically permeable or preferably may be non-magnetically permeable, and may be formed from a solid material or may comprise a tube structure having a hollow center portion.

Figure 11:
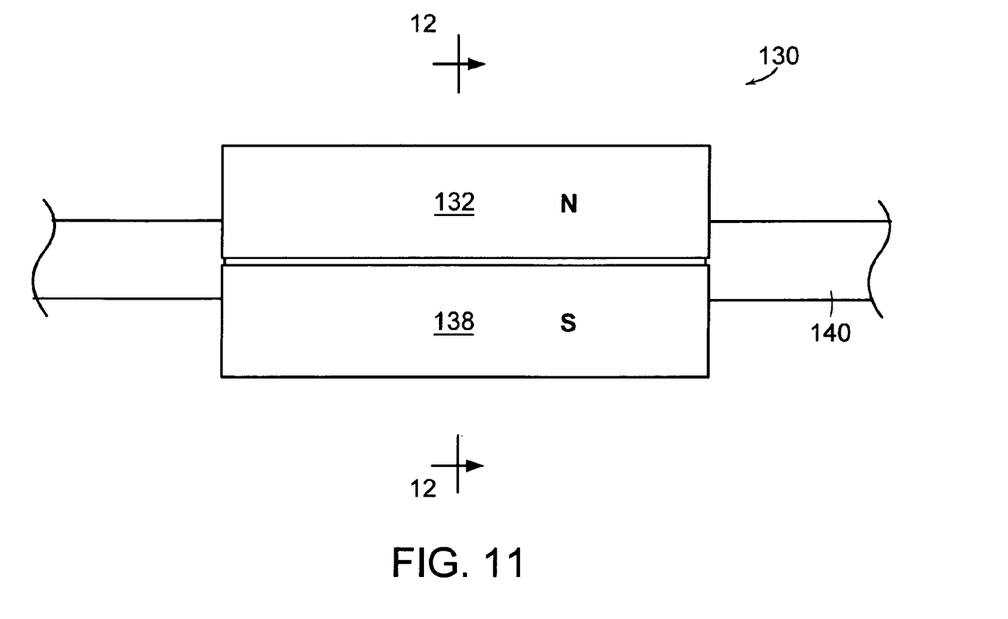
FIG. 11 shows an illustrative side view of the rotor assembly of FIG. 10.
Figure 12:
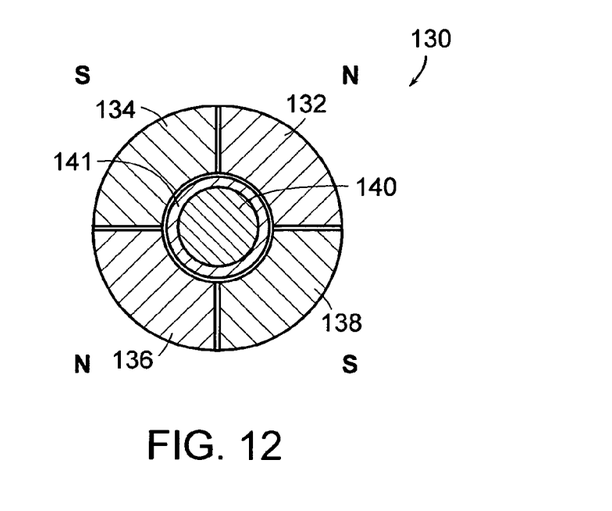
FIG. 12 shows an illustrative sectional view of the rotor assembly of FIG. 11 taken along line 12—12 thereof.

The assembled rotor 130 is shown in FIGS. 11 and 12 such that opposing magnetic segments abut one another providing two pairs of magnetic poles. As will be described below, increasing the number of pole pairs increases the torque available for driving the rotor 130. In further embodiments, more pairs of poles (e.g., three or four pairs) may be provided to further increase the available torque. Further, because the shaft 140 may extend to the scanning elements, there is no need to include end portions such as 12 and 14 shown in FIG. 1, which reduces the inertia of the rotor 130 thereby increasing the amount of rotor acceleration achievable by applying a given torque. Also, the shaft 140 may be formed of any material such as a ceramic, beryllium, beryllium copper or titanium, which may provide increased stiffness in the rotor 140 while reducing the rotor mass and therefore moment of inertia. The increased stiffness further offers opportunity to increase rotor acceleration without adverse effects such as torsional resonance caused by undesirable shaft twisting. In addition, a stiffer material may have sufficient stiffness in a hollow shaft configuration thereby further reducing the moment of inertia of the rotor. In this improvement over the prior art, the magnetically permeable sleeve 141 provides a magnetic flux path between the magnets 132, 134, 136, 138 so that the rotor 140 can be formed hollow and non-magnetically permeable as may be required for stiffness and inertia considerations.

The stator 50 shown in FIGS. 7 and 8 may be used with the rotor of FIGS. 10-12, and may include four composite coil assemblies 52, 54, 56 and 58. Again, each of the coil assemblies is formed by layering flexible circuit composites onto one another and then connecting the composites to form individual coil assemblies. According to the invention, the stator housing, or backiron, is preferably formed of a readily magnetically permeable material such as iron, nickel, cobalt or other ferromagnetic materials for providing a low reluctance flux path through the stator housing, as will be further detailed below. The coil assemblies 52, 54, 56 and 58 are substantially symmetrically positioned around an axial center 60 of the stator.

Figure 13:
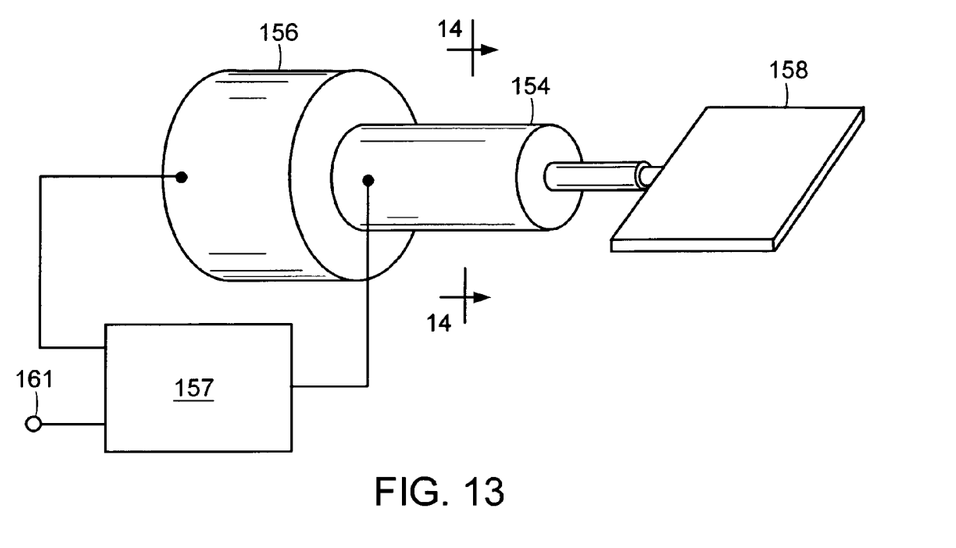
FIG. 13 shows an illustrative isometric view of a galvanometer scanner assembly and mirror in accordance with an embodiment of the invention.

The position transducer provides position feedback during operation. In particular, as shown in FIG. 13, a galvanometer scanner assembly including a scanner motor system in accordance with an embodiment of the invention includes a scanner motor 154, having a rotatable rotor 130, as shown in FIGS. 10–12 with a position transducer 156 for monitoring the position of the rotor 130 attached to one end of the rotor and a scanning element 158, which may comprise a mirror, attached to the output shaft of the scanner motor 154 at an opposite end from the position transducer. Of course, the scanning element 158 and the position transducer 156 may each be attached to the rotor at the same end thereof or in other configurations.

The motor 154 includes stator coil assemblies 52, 54, 56 and 58 for driving the rotor 130. Each stator coil 52, 54, 56 and 58 may be driven by a separate coil current issued by a servo controller 157 or opposing coils, e.g., 52 and 56, may be connected in series or in parallel and driven by the same current issued by the servo controller 157. A rotor angular position feedback signal from the position transducer 156 is delivered to the servo controller 157 to provide information about the instantaneous angular position of the rotor 130. Alternately, or additionally, a rotor velocity sensor (not shown) may also be used to monitor the instantaneous angular velocity of the rotor 130 and feed an instantaneous velocity signal back to the servo controller 157. Additionally, the servo controller 157 may receive an input command 161 from another device such as a computer or processor (not shown). The input command 161 may represent a desired angular position or a desired angular velocity of the scanning element or both position and velocity.

Figure 14:
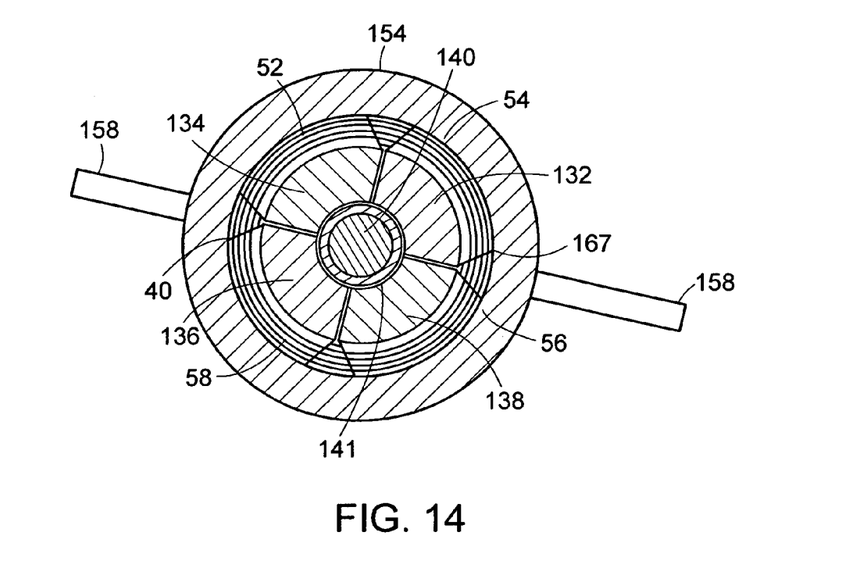
FIG. 14 shows an illustrative sectional view of the galvanometer scanner motor of FIG. 13 taken along line 14—14 thereof.

As shown in FIG. 14, the motor 154 includes the magnetic rotor segments 132, 134, 136 and 138 of FIGS. 10–12 as well as the coil assemblies 52, 54, 56 and 58 of FIG. 8. Once formed, the coil assemblies are fixedly attached to a magnetically permeable housing or backiron 154. The rotor 130 is positioned within the coil assemblies and the housing 154 with a substantially uniform gap 167 surrounding the rotor 130. The rotor 130 is suspended, e.g., by bearings, within gap 167 and is free to rotate about its center axis. According to the invention, the motor 154 provides improved magnetic flux density in the gap 167. In addition, the invention increases the density of coil winding in the gap 167. This improved magnetic flux density and coil winding density leads to increasing the available torque for driving the rotor 130. And, as is stated above, the geometry of the shaft 140 may decrease the inertia of the rotor 130 thereby increasing rotor acceleration achievable at a given torque. The result is a significant increase in torque to inertia ratio providing a limited rotation torque motor that can be more quickly accelerated to a constant velocity and exhibits a velocity having reduced variations or ripple.

In particular, magnetic flux will flow in a path that has the lowest possible total reluctance (or resistance to magnetic flux). Non-ferromagnetic materials (e.g., air and copper in the coil windings in the gap 167) have substantially the same relatively high reluctance compared with the ferromagnetic permanent magnet segments 132, 134, 136 and 138 of the rotor 130, and the ferromagnetic housing or backiron 154. In fact, reluctance in ferromagnetic materials may be several thousand times lower than reluctance in non-ferromagnetic materials. As a result, magnetic flux will flow in the shortest possible path from one magnetic pole, e.g., N, to an adjacent opposite pole, e.g., S, by the path of least reluctance. In galvanometer motors, it is important to generate a high flux density across the gap 167 and to utilize as much flux as possible for good motor performance.

Figure 15:
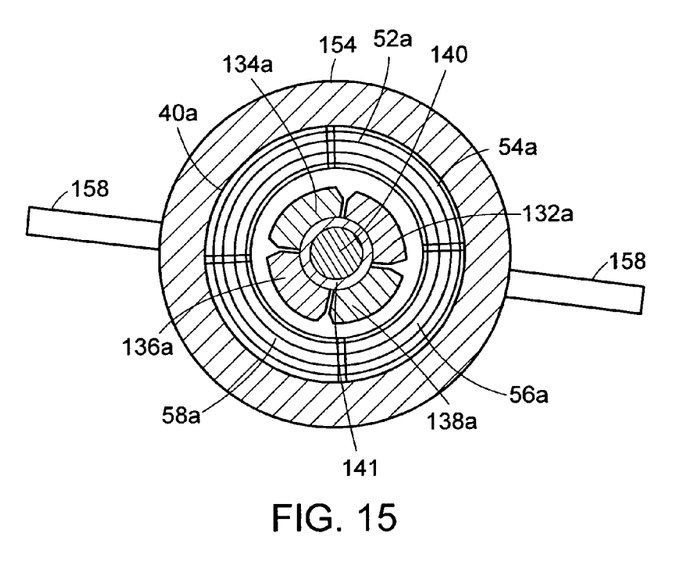
FIG. 15 shows an illustrative sectional view similar to that shown in FIG. 14 of a galvanometer scanner motor in accordance with a further embodiment of the invention.

FIG. 15 shows a cross-sectional view of a four-pole galvanometer structure in accordance with a further embodiment of the invention that more effectively uses the volume of space in the motor to produce additional torque. The four coil assemblies 52a, 54a, 56a, 58a entirely fill the volume between the rotor and the stator interior (except for clearance for rotor rotation). This is achieved by providing each set of four flexible circuit composites along the web shown in FIG. 6 with circuit widths that increase with the number of turns, similar to the procedure discussed above with respect to the spacing.

Figure 17:
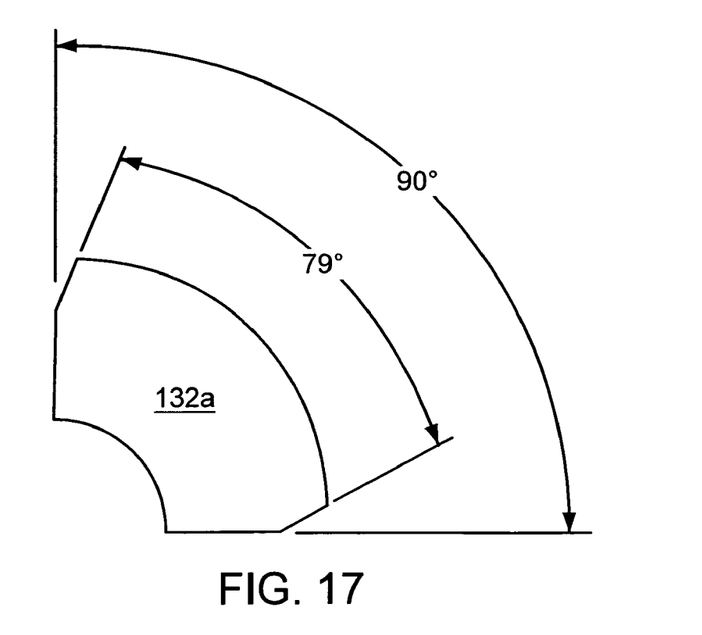
FIG. 17 shows an illustrative diagrammatic view of a magnetic segment used in the motor of FIG. 15.

The four magnet segments 132a, 134a, 136a, 138a taken together may have an effective subtended angle of 270 degrees (360 degrees −4×22.5 degrees of mechanical rotation). As a further improvement over the prior art two pole systems, the tips of the magnet sectors 132a, 134a, 136a, 138a are cut back or beveled at their outer surfaces, near the boundaries between sectors thereby producing a magnetic flux focusing effect that causes the flux from 90 degrees of magnet segment, e.g., 132a, to pass through 79 degrees of pole. This is shown in FIG. 17. This improvement eliminates the regions of the magnetic material that lead to flux fringing effects. The removal of the material increases the flux density in other regions of the gap 167 and may provide up to a 15% flux density increase under ideal circumstances. In addition, since in the four pole, four coil configuration magnet sections are always opposed to a coil section throughout the rotation of the rotor 130, any remaining fringing flux still passes through a coil winding so that even the fringing flux contributes to generating torque in the motor. In addition, by providing a four poll magnet, the length of flux path circuit is reduced by about 50% when compared with a conventional two-pole device because the poles are only 90 degrees apart instead of 180 degrees apart. This reduced flux path length reduces losses thereby further increasing available torque. Finally, assuming the same packing density as in conventional two-pole galvanometers, 33% more wire will fit into the gap of a four-pole configuration of the present invention.

Figure 16:
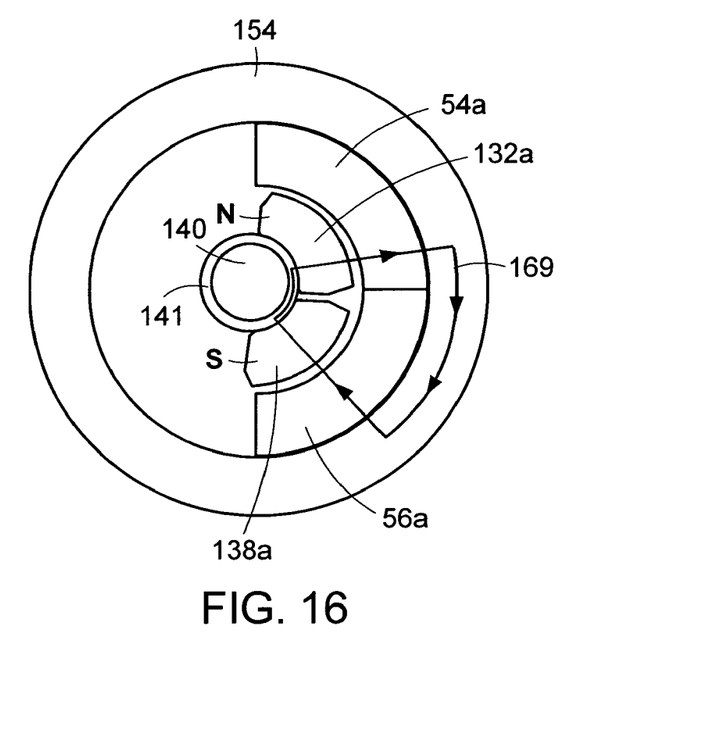
FIG. 16 shows an illustrative diagrammatic sectional view through the motor of FIG. 15 showing illustrative lines of flux.

An improved magnetic flux path for one half of a motor according to the present invention is shown in FIG. 16. Magnetic flux generated by the permanent magnets 132a and 138a is shown by the flux lines 169 in FIG. 12. As shown in FIG. 6, the magnetic flux flows from, for example the N pole of magnet 132a, across the gap 167 to the backiron 154, along a circumferential path in the backiron 154, across the gap 167, a second time, to the S pole of magnet 138a and then through the magnetic section 138a and the magnetically permeable sleeve 141 to return to the magnetic section 132a. In addition to the magnetic flux generated by the magnetic sections 132a and 138a, a current passing through the coils 54a and 56a generates a separate and controllable magnetic flux that is used to act on the magnetic sections 132a and 138a to generate a rotation torque for rotating the rotor 130 in a desired manner. According to the present invention, more torque may be utilized for driving the rotor because there is a more efficient use of magnetic material on the rotor 130 and a more efficient use of coil windings in the stator.

In a simple symmetric geometry such as the one shown in FIG. 15, the torque of the rotor is obtained by calculating the force on a single conductor, and integrating over the number of conductors, assuming an average flux density in the gap and an average radius of the conductor from the axis of rotation. The force, in grams, on a conductor is given by $$F=(6.59BLI)/10^4$$

where B is the average flux density in the gap 167, in units of Gauss, about 2500, L is the length of a conductor, in centimeters, about =3.0 cm, and I is the current, in Amperes (use 1=ampere for simplicity). Solving with these values, the force per conductor is 4.94 grams per Ampere.

For the four-pole motor of the present invention, it is described above how the flux density in the gap 167 may be up to 15% higher. Accordingly, the force on a conductor of the present invention is 5.68 grams per Ampere. Assuming the same average radius of the conductors, (0.8 cm for the rotation axis to the coil average radius), the torque per conductor in the prior art two-pole motor is 3.95 gm-cm per Ampere, and for the four-pole configuration of the present invention it is 4.55 gm-cm per Ampere. With 125 conductors, the prior art two-pole galvanometer thus has a torque constant of 494 gm-cm per ampere. The four-pole galvanometer can fit 166 conductors, and the torque per conductor is 4.55 gm-cm per ampere, so the four-pole galvanometer of the present invention produces more than a 50% torque improvement or a torque constant of 755 gm-cm per ampere.

A conventional two-pole rotor of the prior art is a solid cylinder of permanent magnet 5 cm long and 1 cm in diameter. With a density of 6.0 gm/cm$^3$, it has a moment of inertia of 2.95 gm-cm$^2$. The four-pole rotor of the present invention replaces the central 0.4 cm of the magnet cylinder with a hollow ceramic cylinder whose moment of inertia is 0.14 gm-cm$^2$. The magnet assembly itself, because of the focusing notches, has a moment of inertia of 2.25 gm-cm$^2$. Adding these together, we have a rotor moment of inertia of 2.39 gm-cm$^2$ providing a 19% reduction in rotor moment of interia.

One of the significant figures of merit for a galvanometer is the torque to inertia ratio, because a larger ratio allows faster acceleration and settling. In the case of a prior art two-pole motor, the ratio is 494 gm-cm per amp divided by 2.95 gm-cm$^2$, yielding a figure of merit of 167, while the four-pole configuration yields 775/2.39=324, a 94%-better figure of merit. The torque to inertia ratio is preferably greater than 200 and in certain embodiments is more preferably greater than 300.

Figure 18:
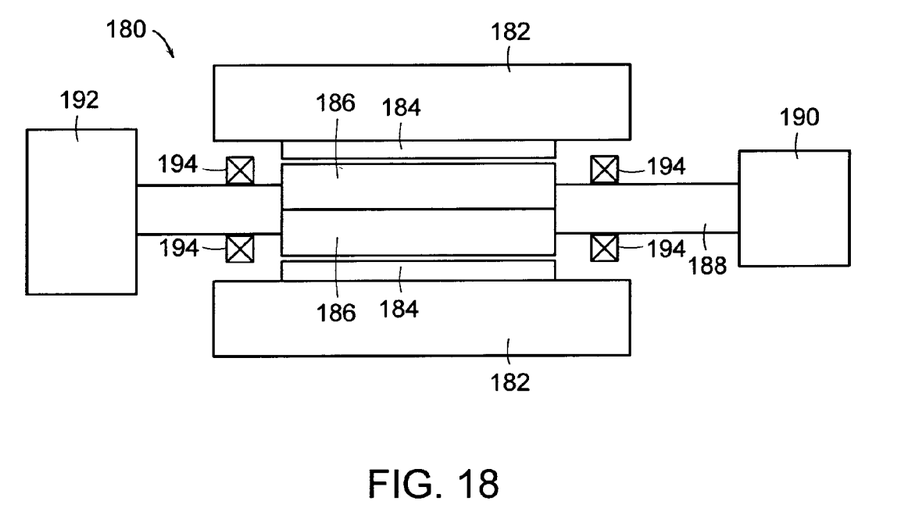
FIG. 18 shows an illustrative sectional view of a galvanometer scanner assembly using a galvanometer scanner motor of the invention.
Figure 19:
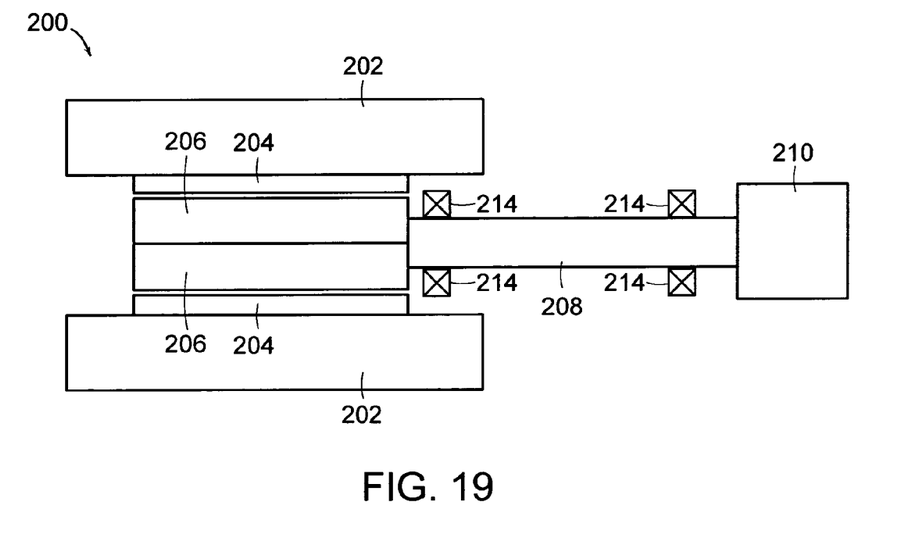
FIG. 19 shows an illustrative sectional view of a further galvanometer scanner assembly using a galvanometer scanner motor of the invention.

A galvanometer assembly 180 including a motor in accordance with an embodiment of the invention includes a backiron 182, stator coils 184 and magnetic segments 186 that are secured to a shaft 188 as shown in FIG. 18. The shaft 188 is rotatably mounted to a housing structure (not shown) via bearings 194. A scanner element such as a mirror 190 is mounted to one end of the shaft 188 while a position transducer 192 is mounted to the other end of the shaft 188. As shown in FIG. 19, a galvanometer assembly 200 including a motor in accordance with an embodiment of the invention includes a backiron 202, stator coils 204 and magnetic segments 206 that are secured to a shaft 208. A mirror 210 is attached to the shaft and the shaft is rotatably secured to a housing structure (not shown) via bearings 214. The galvanometer assembly 200 may further include a position transducer positioned along the rotor 208.

Those skilled in the art will appreciate that numerous modifications and variations may be made to the above disclosed embodiments without departing from the spirit and scope of the invention.

What is claimed is:

1. A limited rotation torque motor comprising a rotor including at least one pair of magnetic poles and a stator including at least one pair of stator coils, each stator coil including a plurality of layers of interconnected flexible circuit composites, each flexible circuit composite including a dielectric material and a patterned conductive material on one side of said dielectric material, wherein said at least one pair of stator coils is formed on a continuous web having a plurality of individual flat coil windings formed onto a flexible dielectric layer that is wrapped upon itself such that said plurality of layers of interconnected flexible circuit composites comprises individual flat conductive layers overlaying one another with alternating dielectric therebetween; and said flexible circuit composites each include an inner edge, and the inner edges are non-uniformly spaced from one another on said continuous web to accommodate the thickness of said web as it is wrapped upon itself in forming a set of stator coils to provide that at least two stator coils are formed such that each stator coil includes:

an innermost flexible circuit composite located near an inner edge of said continuous web,     an outermost flexible circuit composite located near an outer edge of said continuous web, and     at least one intermediate flexible circuit composite between said innermost flexible circuit composite and said outermost flexible circuit composite.

2. A limited rotation torque motor as claimed in claim 1, wherein the innermost flexible circuit, the one or more intermediate flexible circuits and the outmost flexible circuit of each said stator coil are connected together in series.

3. A limited rotation torque motor as claimed in claim 2, wherein said at least two stator coils include a first stator coil that is connected in parallel with a second stator coil.

4. A limited rotation torque motor as claimed in claim 1, wherein said at least one pair of magnetic poles comprises two pairs of substantially opposing magnetic poles attached to a rotor shaft such that each magnetic pole substantially subtends 90 degrees of rotation about the rotor shaft.

5. A limited rotation torque motor as claimed in claim 4 further comprising a readily magnetically permeable cylindrical housing surrounding the rotor such that a substantially uniform radial gap is formed between the magnetic poles and an inner radius of the cylindrical housing and wherein said opposing pair of stator coils comprises two pairs of opposing coils substantially filling the radial gap and further wherein each coil subtends 90 degrees of rotation about the rotor shaft.

6. A limited rotation torque motor as claimed in claim 4, wherein said rotor shaft comprises a magnetically permeable sleeve surrounding a substantially non-magnetically permeable center portion.

7. A limited rotation torque motor as claimed in claim 1, wherein said motor has a torque to inertia ratio of at least 200.

8. A limited rotation torque motor as claimed in claim 1, wherein said motor provides a torque constant of at least 700 gm-cm per ampere.

9. A limited rotation torque motor as claimed in claim 1, wherein spacing distances between said flexible circuit composites are non-uniform along said continuous web.

10. A galvanometer scanner motor including a rotor having a shaft and a plurality of pairs of permanent magnets fixed to said shaft and a plurality of coil assemblies that extend along a longitudinal length of the scanner motor for receiving a current therein to impart a rotation torque to the rotor, said plurality of coil assemblies each including a plurality of interconnected flexible circuit composites, wherein each said coil assembly includes a first plurality of layers of flexible circuit composites that are connected together in series, and wherein each said coil assembly includes a second plurality of layers of flexible circuit composites that are connected in parallel with said first plurality of layers of flexible circuit composites.

11. A galvanometer scanner motor as claimed in claim 10, wherein said coil assemblies are provided on a continuous web that is wrapped upon itself such that layers of flexible circuit composites overlay one another.

12. A galvanometer scanner motor as claimed in claim 11, wherein said flexible circuit composites are each spaced from one another on said continuous web to accommodate the thickness of said web as it is wrapped upon itself in forming a set of stator coils.

13. A galvanometer scanner motor as claimed in claim 10, wherein said flexible circuit composites are formed, at least in part, using chemical vapor deposition.

14. A galvanometer scanner motor as claimed in claim 10, wherein said flexible circuit composites are formed, at least in part, using vacuum deposition.

15. A method of forming a stator coil for a galvanometer scanner motor, said method including the steps of:

depositing a conductive material on a continuous web of first dielectric material;

etching first portions of said conductive material to provide a conductive pattern portion on said continuous web;

radially stacking a plurality of conductive pattern portions such that inner edges of said conductive pattern portions are non-uniformly spaced from one another on said continuous web to accommodate the thickness of said web as it is wrapped upon itself to provide at least two stator coils, each of which includes an innermost conductive pattern located near an inner edge of said continuous web, an outermost conductive pattern located near an outer edge of said continuous web, and at least one intermediate conductive pattern between said innermost conductive pattern and said outermost conductive pattern; and     electrically connecting the stacked conductive patterns of each stator coil together to form a stator coil winding.

16. A method of forming a stator coil as claimed in claim 15, wherein said step of electrically connecting the stacked conductive patterns of each stator coil together to form a stator coil winding includes connecting the stacked conductive patterns together in series.

17. A method of forming a stator coil as claimed in claim 15, wherein said method further includes the step of electrically connecting each stator coil together in parallel.

\* \* \* \* \*